United States Patent
Nagaoka et al.

(10) Patent No.: US 7,034,870 B2
(45) Date of Patent: Apr. 25, 2006

(54) IMAGE PICKUP APPARATUS WITH REDUCED FLICKER AND AUTOMATIC LEVEL ADJUSTING METHOD OF THE SAME

(75) Inventors: Hidetada Nagaoka, Tokyo (JP); Narihiro Matoba, Tokyo (JP); Takeo Fujita, Tokyo (JP); Hiroaki Sugiura, Tokyo (JP); Tetsuya Kuno, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 844 days.

(21) Appl. No.: 09/921,875

(22) Filed: Aug. 6, 2001

(65) Prior Publication Data

US 2002/0044205 A1 Apr. 18, 2002

(30) Foreign Application Priority Data

Sep. 8, 2000 (JP) ............................. 2000-273668

(51) Int. Cl.
*H04N 9/73* (2006.01)
*H04N 11/20* (2006.01)
*H04N 5/222* (2006.01)
*H01L 27/00* (2006.01)

(52) U.S. Cl. .............................. 348/228.1; 348/226.1; 348/447; 348/370; 348/296; 250/208.1

(58) Field of Classification Search ............ 348/226.1, 348/255, 447, 910, 370, 371, 296; 346/228.1
See application file for complete search history.

(56) References Cited

U.S. PATENT DOCUMENTS 6,271,884 B1 * 8/2001 Chung et al. ................ 348/370
6,295,085 B1 * 9/2001 Munson et al. ........... 348/226.1
6,519,002 B1 * 2/2003 Tomaszewski ........... 348/226.1

(Continued)

FOREIGN PATENT DOCUMENTS

EP 971534 A2 * 1/2000

(Continued)

OTHER PUBLICATIONS

Translation of Japanese Publ. No. 10-198650; FLS, Inc., Feb. 2004.*

*Primary Examiner*—Ngoc-Yen Vu
*Assistant Examiner*—John M. Villecco
(74) *Attorney, Agent, or Firm*—Birch,Stewart,Kolasch & Birch,LLP

(57) ABSTRACT

An image pickup apparatus includes a solid-state imaging device, an accumulating section, first and second imaging parameter setting sections, a calculating section, a flicker detecting section, and a switching section. The accumulating section calculates a projection output value of a predetermined line in a frame. The calculating section calculates inter-frame variations of the projection output values, and calculates a flicker index from the variations of a predetermined number of frames. The flicker detecting section detects the flicker from the index, and controls the switching section in response to the detection result of the flicker, so that the switching section selects either the setting signals from the first imaging parameter setting section or the setting signals from the second imaging parameter setting section. Thus, the charge storage time of the solid-state imaging device is set at either an integer multiple of $1/100$ second or an integer multiple of $1/120$ second in response to the frequency (50 Hz or 60 Hz) of a power supply of the fluorescent lighting. The image pickup apparatus can solve a problem of a conventional apparatus in that it is difficult for the conventional apparatus to suppress the flicker in regions where the frequency of the power supply differ from each other.

13 Claims, 14 Drawing Sheets

U.S. PATENT DOCUMENTS

| | | | |
|---|---|---|---|
| 6,657,659 B1 * | 12/2003 | Van Rooy et al. | 348/226.1 |
| 6,710,818 B1 * | 3/2004 | Kasahara et al. | 348/226.1 |
| 6,771,305 B1 * | 8/2004 | Smith et al. | 348/84 |
| 2002/0158971 A1 * | 10/2002 | Daiku et al. | 348/226.1 |
| 2005/0093996 A1 * | 5/2005 | Kinoshita | 348/226.1 |
| 2005/0157203 A1 * | 7/2005 | Nakakuki et al. | 348/370 |
| 2005/0206745 A1 * | 9/2005 | Daiku et al. | 348/226.1 |

FOREIGN PATENT DOCUMENTS

| | | | |
|---|---|---|---|
| EP | 1024660 A2 * | 8/2000 | |
| GB | 2284318 A * | 5/1995 | |
| JP | 03001665 A * | 1/1991 | |
| JP | A031665 | 1/1991 | |
| JP | A6189203 | 7/1994 | |
| JP | 08088794 A * | 4/1996 | |
| JP | 08265652 A * | 10/1996 | |
| JP | 10098650 A * | 4/1998 | |
| JP | 11069217 A * | 3/1999 | |
| JP | A1188780 | 3/1999 | |
| JP | A2000032330 | 1/2000 | |
| JP | 2000 244822 A | 9/2000 | |

* cited by examiner

IMAGE PICKUP APPARATUS WITH REDUCED FLICKER AND AUTOMATIC LEVEL ADJUSTING METHOD OF THE SAME

BACKGROUND OF THE INVENTION

1. Field of the Invention

The present invention relates to an image pickup apparatus and automatic level adjusting method applicable to a digital still camera and the like, and more particularly to an image pickup apparatus and automatic level adjusting method capable of suppressing flicker generated in fluorescent lighting.

2. Description of Related Art

When using a CMOS sensor as a solid-state imaging device of an image pickup apparatus such as a digital still camera for taking still pictures, bright and dark horizontal striped patterns can occur in pictures taken in an environment in which brightness varies periodically such as in the fluorescent lighting. They arise from the difference between the timing of the flickering of the fluorescent lighting and that of the photoelectric conversion of individual pixels of the pictures. This phenomenon is referred to as flicker.

To suppress the flicker, there are such conventional methods as averaging pickup data over several past frames; or setting charge storage time such that it becomes an integer multiple of the flickering period of a light source. An example of the latter is disclosed in Japanese patent application laid-open No. 2000-32330. This method carries out the level adjustment as follows: When the subject illuminance reduces and the charge storage time of the imaging device becomes longer than 1/(flickering frequency of the light source) second, this method limits the allowed charge storage time to an integer multiple of 1/(flickering frequency of the light source) second. As for the fraction of the charge storage time less than the adjustable step by the integer multiple of the 1/(flickering frequency of the light source) second, the level adjustment is carries out by controlling the gain of an amplifier of the image pickup apparatus.

FIG. 14 is a block diagram showing a configuration of an automatic level adjusting apparatus for implementing the conventional automatic level adjusting method disclosed in the foregoing Japanese patent application laid-open No. 2000-32330. In FIG. 14, the reference numeral 101 designates an imaging device; 102 designates a correlated double sampling circuit (CDS); 103 designates an analog amplifier; 104 designates an A/D converter; 105 designates a digital amplifier; 106 designates a frame average calculating circuit; 107 designates an electronic shutter speed controller; 108 designates a digital amplifier controller; and 109 designates a timing signal generator for generating a timing signal for operating the electronic shutter of the imaging device.

Next, the operation of the conventional automatic level adjusting apparatus will be described.

An analog video signal captured by the imaging device 101 passes through the noise elimination by the CDS 102, and is amplified by a fixed factor by the analog amplifier 103. The signal output from the analog amplifier 103 is converted into a digital signal by the A/D converter 104. The digital signal is amplified by the digital amplifier 105, and transferred to a camera signal processor at the next stage not shown.

On the other hand, the output of the digital amplifier 105 is supplied to the frame average calculating circuit 106, and its calculation result is supplied to the electronic shutter speed controller 107 and digital amplifier controller 108. The electronic shutter speed controller 107 and digital amplifier controller 108 determine the electronic shutter speed and the gain of the digital amplifier for controlling the charge storage time of the imaging device 101 through the timing signal generator 109, and the amplification factor of the digital amplifier 105.

Next, the conventional automatic level adjusting method will be described in more detail. FIG. 15 is a diagram illustrating the conventional automatic level adjusting method concretely.

As illustrated in FIG. 15, the flickering frequency of the light source is assumed to be $1/100$ second. Initially, assume that the output is set at a specified level in the condition that the subject illuminance is high, the electronic shutter speed is fastest, and the gain of the digital amplifier 105 is minimum (+0 dB). If the subject illuminance reduces from the condition, the output level falls below the specified level. In this case, the electronic shutter speed is made slower to increase the output level. If the output is still less than the specified level even when the electronic shutter speed becomes $1/100$ second, the gain of the digital amplifier 105 is increased with maintaining the electronic shutter speed at $1/100$ second. If the output is still less than the specified level even when the gain of the digital amplifier 105 becomes maximum (a little less than +6 dB), the electronic shutter speed is set at $1/50$ second, and the gain of the digital amplifier 105 is adjusted at the minimum (+0 dB). If the output is still less than the specified level, the gain of the digital amplifier 105 is increased up to the maximum (a little less than +6 dB) with maintaining the electronic shutter speed at $1/50$ second.

With the foregoing configuration, the conventional automatic level adjusting method has a following problem depending on the frequency of a power supply: Although the illuminance fluctuation period of a fluorescent lamp is $1/100$ second in a region where the frequency of the power supply is 50 Hz, that in the region where the frequency of the power supply is 60 Hz, it is $1/120$ second. Thus, the illuminance fluctuation period of the fluorescent lamp varies depending on the frequency of an alternating power supply, and this presents the main cause of the flicker. As a result, although the flicker is suppressed in one region, it cannot be suppressed in another region because of the different illuminance fluctuation period.

SUMMARY OF THE INVENTION

The present invention is implemented to solve the foregoing problem. It is therefore an object of the present invention to provide an image pickup apparatus and its automatic level adjusting method capable of obtaining high quality pictures with suppressing the flicker even if the frequency of a power supply varies with regions.

According to a first aspect of the present invention, there is provided an image pickup apparatus comprising: a solid-state imaging device for generating an image signal by carrying out photoelectric conversion of individual pixels at different timings; an amplifier for amplifying the image signal; and an automatic level adjusting section for regulating a level of the image signal at a specified level by automatically controlling a charge storage time of the solid-state imaging device and a gain of the amplifier, wherein the automatic level adjusting section comprises: a first setting section for setting the charge storage time of the solid-state imaging device at an integer multiple of half a reciprocal of a frequency of a first power supply; a second setting section for setting the charge storage time of the solid-state imaging device at an integer multiple of half a reciprocal of a frequency of a second power supply; a switching section for selecting one of the first setting section and the second setting section to set the charge storage time of the solid-state imaging device; an accumulating section for accumulating a plurality of pixel values of a predetermined line in a frame; an index calculating section for calculating inter-frame variations of accumulation values obtained by the accumulating section, and for calculating an index for detecting the flicker from the inter-frame variations of a predetermined number of frames; and a flicker detecting section for detecting flicker in response to the index of the index calculating section, and for controlling the switching section in response to the detection result of the flicker.

Here, the first setting section may set the charge storage time of the solid-state imaging device at an integer multiple of $1/100$ second, and the second setting section may set the charge storage time of the solid-state imaging device at an integer multiple of $1/120$ second.

The index calculating section may calculate the index by accumulating the variations of accumulation values of individual frames over a predetermined number of frames, which accumulation values are obtained by the accumulating section.

The flicker detecting section may compare the index obtained when the first setting section is in operation with the index obtained when the second setting section is in operation, and control the switching section in response to a compared result.

The flicker detecting section may compare the index obtained when one of the first setting section and the second setting section is in operation with a predetermined threshold value, and control the switching section in response to a compared result.

The index calculating section may comprise: a plurality of memories for storing indices calculated from accumulation values obtained by the accumulating section over a predetermined number of frames; a sum calculating section for calculating a sum of the indices of the predetermined number of frames; and a maximum differential calculating section for calculating a difference between a maximum value and a minimum value of the indices of the predetermined number of frames.

The image pickup apparatus may further comprise a threshold value setting section for setting a predetermined threshold value to be supplied to the flicker detecting section in response to the image signal captured by the solid-state imaging device, wherein the flicker detecting section may detect the flicker by comparing the index with the threshold value.

The threshold value setting section may comprise a look-up table, and set the threshold value corresponding to the image signal referring to the look-up table.

The image pickup apparatus may further comprise a masking section for masking a control signal supplied from the flicker detecting section to the switching section to halt the switching operation of the switching section.

The masking section may mask the control signal to the switching section in response to an accumulation value by the accumulating section, the accumulation value being obtained by accumulating the pixel values over all or part of a frame of the image signal captured by the solid-state imaging device.

The masking section may mask the control signal to the switching section in response to the charge storage time of the solid-state imaging device.

The masking section may mask the control signal to the switching section in response to a gain of the amplifier.

According to a second aspect of the present invention, there is provided an automatic level adjusting method applied to an image pickup apparatus including a solid-state imaging device for generating an image signal by carrying out photoelectric conversion of individual pixels at different timings, and an amplifier for amplifying the image signal, the automatic level adjusting method regulating a level of the image signal at a specified level by automatically controlling a charge storage time of the solid-state imaging device and a gain of the amplifier, and the automatic level adjusting method comprising the steps of: accumulating a plurality of pixel values of a predetermined line in a frame; calculating inter-frame variations of accumulation values, and calculating an index for detecting flicker from the inter-frame variations of a predetermined number of frames; detecting the flicker in response to the index, and setting, in response to the detection result of the flicker, the charge storage time of the solid-state imaging device at one of an integer multiple of half a reciprocal of a frequency of a first power supply and an integer multiple of half a reciprocal of a frequency of a second power supply.

DETAILED DESCRIPTION OF THE PREFERRED EMBODIMENTS

The invention will now be described with reference to the accompanying drawings.

Embodiment 1

Figure 1:
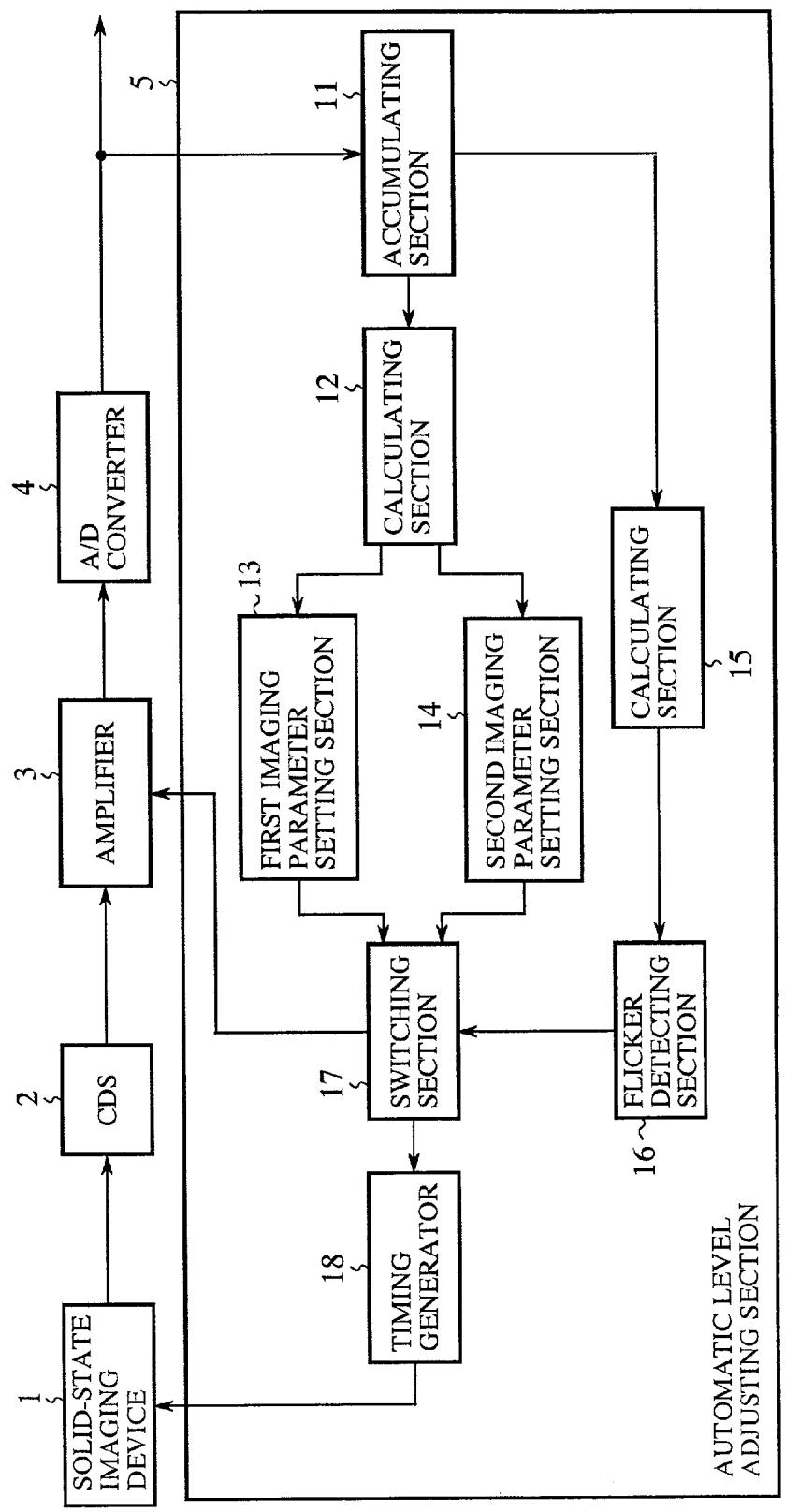
FIG. 1 is a block diagram showing a configuration of an embodiment 1 of the image pickup apparatus in accordance with the present invention.

FIG. 1 is a block diagram showing a configuration of an embodiment 1 of the image pickup apparatus in accordance with the present invention. In FIG. 1, the reference numeral 1 designates a solid-state imaging device such as a CMOS sensor for generating an image signal by the photoelectric conversion of individual pixels at different timings; 2 designates a correlated double sampling circuit (CDS) for canceling noise in the image signal; 3 designates an amplifier for amplifying the image signal; 4 designates an A/D converter for converting the image signal into digital data; and 5 designates an automatic level adjusting section for automatically controlling the charge storage time of the solid-state imaging device 1 and the gain of the amplifier 3.

In the automatic level adjusting section 5, the reference numeral 11 designates an accumulating section for accumulating a plurality of pixel values on a specified line in a frame; 12 designates a calculating section for carrying out a processing for the automatic level adjustment in response to the level of the image; 13 designates a first imaging parameter setting section for producing a setting signal for setting the charge storage time of the solid-state imaging device 1 at an integer multiple of $\frac{1}{100}$ second and a setting signal for setting the amplification factor of the amplifier 3 in response to the calculation result of the calculating section 12; and 14 designates a second imaging parameter setting section for producing a setting signal for setting the charge storage time of the solid-state imaging device 1 at an integer multiple of $\frac{1}{120}$ second and a setting signal for setting the amplification factor of the amplifier 3 in response to the calculation result of the calculating section 12.

The reference numeral 15 designates a calculating section for computing inter-frame variations of accumulation values obtained by the accumulating section 11, and for computing an index for detecting the flicker from the variations over a predetermined number of frames; 16 designates a flicker detecting section for detecting the flicker using the index fed from the index calculating section 15, and for controlling a switching section 17 in response to the detection result; 17 designates the switching section for selecting either the setting signals fed from the first imaging parameter setting section 13 or the setting signals fed from the second imaging parameter setting section 14 in response to the control signal from the flicker detecting section 16, for supplying the amplifier 3 with the setting signal of the amplification factor, and for supplying a timing generator 18 with the setting signal of the charge storage time; and 18 designates the timing generator for controlling the charge storage time of the solid-state imaging device 1 in response to the setting signal of the charge storage time fed through the switching section 17.

Next, the operation of the present embodiment 1 will be described.

An optical image incident on the solid-state imaging device 1 is converted into the image signal by the solid-state imaging device 1, and the image signal passes through the noise elimination by the CDS 2. The image signal output from the CDS 2 is amplified by the amplifier 3, converted into the digital data by the A/D converter 4, and supplied to a post-stage processor (not shown) as the pixel data.

In the automatic level adjusting section 5, the accumulating section 11 accumulates the pixel data frame by frame over the entire frame or part of the frame, and supplies the accumulation values to the calculating section 12. Besides, the accumulating section 11 supplies the calculating section 15 with the accumulation value obtained by accumulating the pixel data on a predetermined mth horizontal line, that is, the projection output value of the horizontal line.

In response to the accumulation values from the accumulating section 11, the calculating section 12 calculates the imaging parameter setting values for capturing the next frame such that the signal level of the image becomes constant, and supplies the imaging parameter setting values to the first and second imaging parameter setting sections 13 and 14.

In response to the imaging parameter setting values, the first and second imaging parameter setting sections 13 and 14 each output the gain setting signal for the amplifier 3, and the charge storage time setting signal for the timing generator 18.

In this case, the first imaging parameter setting section 13 produces the charge storage time setting signal that will place the charge storage time at an integer multiple of $\frac{1}{100}$ second to prevent the flicker in a region where the frequency of the alternating power supply is 50 Hz. Likewise, the second imaging parameter setting section 14 produces the charge storage time setting signal that will place the charge storage time at an integer multiple of $\frac{1}{120}$ second to prevent the flicker in a region where the frequency of the alternating power supply is 60 Hz. On the other hand, when the image pickup environment has high illuminance, the first imaging parameter setting section 13 produces the setting signal for setting the charge storage time shorter than $\frac{1}{100}$ second, and the second imaging parameter setting section 14 produces the setting signal for setting the charge storage time shorter than $\frac{1}{120}$ second.

The switching section 17 selects the gain setting signal and the charge storage time setting signal fed from the first imaging parameter setting section 13 or from the second imaging parameter setting section 14, and supplies the selected gain setting signal to the amplifier 3, and the selected charge storage time setting signal to the timing generator 18.

On the other hand, the calculating section 15 computes the flicker index for detecting the flicker from the projection output values fed from the accumulating section 11, and supplies it to the flicker detecting section 16. The flicker detecting section 16 controls the switching section 17 in response to the flicker index, so that the switching section 17 selects the setting signals from the first imaging parameter setting section 13 or the setting signals from the second imaging parameter setting section 14. Thus, the gain setting signal and charge storage time setting signal suitable for suppressing the flicker in the present region are supplied to the amplifier 3 and timing generator 18.

Figure 2:
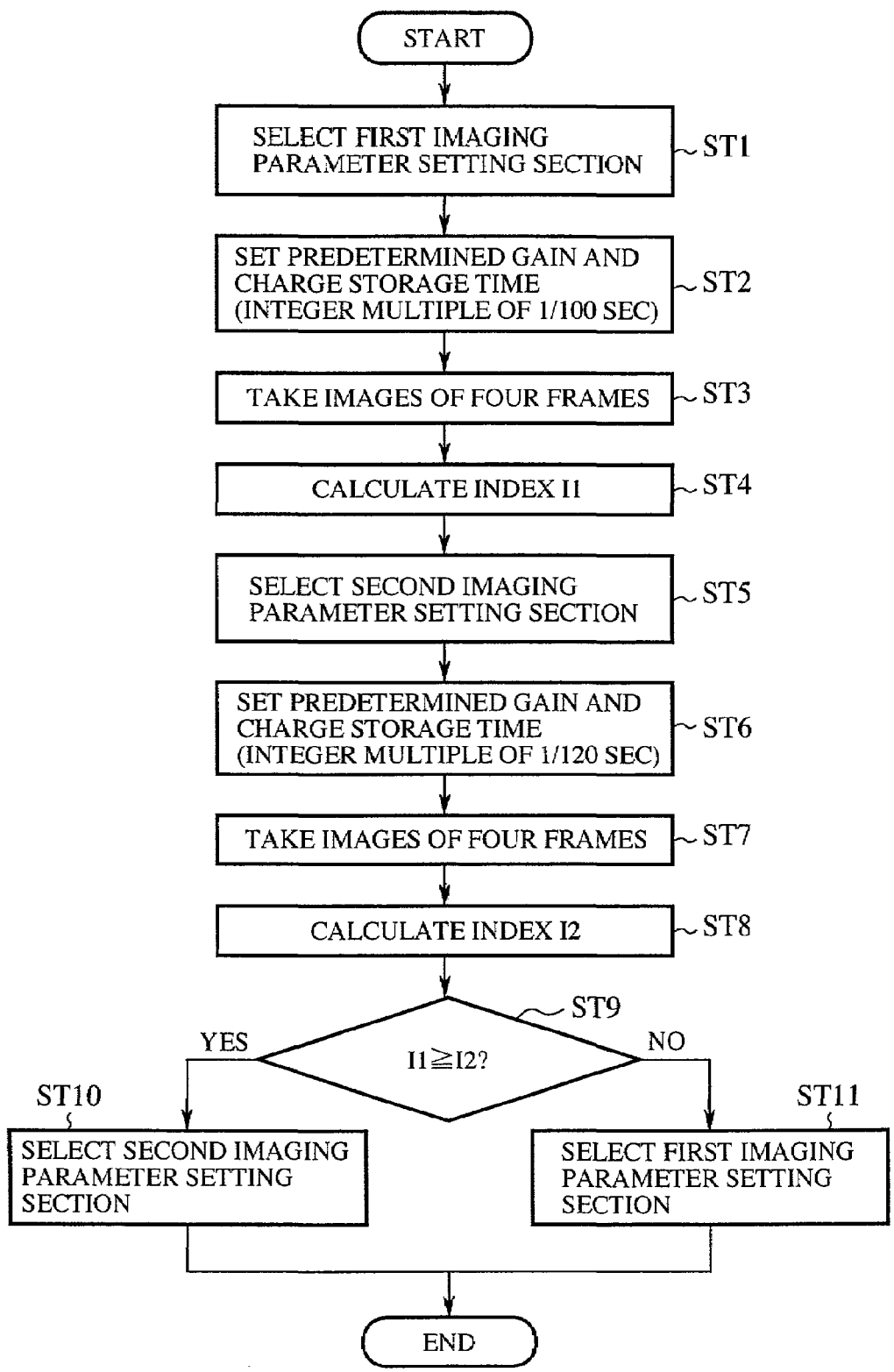
FIG. 2 is a flowchart illustrating calculation of a present flicker index, and selection of a gain setting signal and a charge storage time setting signal in the embodiment 1.

Next, a description will be provided of calculating the present flicker index and selecting the gain setting signal and charge storage time setting signal suitable for suppressing the flicker in the region. FIG. 2 is a flowchart illustrating the calculation of the present flicker indices, and the selection of the gain setting signal and charge storage time setting signal in the embodiment 1.

First, at step ST1, at an initial stage such as power-up, the flicker detecting section 16 controls the switching section 17 such that it selects the setting signals from the first imaging parameter setting section 13. Then, the first imaging parameter setting section 13 outputs the predetermined gain setting signal and the charge storage time setting signal for setting the charge storage time at an integer multiple of $\frac{1}{100}$ second (step ST2). In this condition, four frames are acquired (step ST3). While capturing the four frames, the gain of the amplifier 3 and the charge storage time of the solid-state imaging device 1 are maintained at fixed values.

Subsequently, the accumulating section 11 computes the projection output values of the predetermined horizontal lines of the individual frames, and supplies them to the calculating section 15. In response to the projection output values of the four frames, the calculating section 15 computes a flicker index I1, and supplies it to the flicker detecting section 16 (step ST4). For example, the flicker index I1 is computed as the accumulation value of the variations in the projection output values D(n) by the following expression (1), where D(n) is the projection output value of the mth line of the nth frame.

$$I1, I2 = \sum_{n=k}^{k+3} abs(D(n+1) - D(n)) \quad (1)$$

Subsequently, the flicker detecting section 16 controls the switching section 17 such that it selects the setting signals from the second imaging parameter setting section 14 (step ST5) Then, the second imaging parameter setting section 14 outputs the predetermined gain setting signal and the charge storage time setting signal for setting the charge storage time at an integer multiple of $\frac{1}{120}$ second (step ST6). In this condition, four frames are acquired (step ST7). While capturing the four frames, the gain of the amplifier 3 and the charge storage time of the solid-state imaging device 1 are maintained at fixed values.

Subsequently, the accumulating section 11 computes the projection output values of the predetermined horizontal lines of the individual frames, and supplies them to the calculating section 15. In response to the projection output values of the four frames, the calculating section 15 computes a flicker index I2 (step ST8).

Then, the flicker detecting section 16 makes a decision as to whether the flicker index I1 is greater than or equal to the flicker index I2 (step ST9).

When the flicker index I1 is greater than or equal to the flicker index I2, the flicker detecting section 16 makes a decision that the frequency of the power supply is 60 Hz, and controls the switching section 17 such that it selects the setting signals from the second imaging parameter setting section 14 for the subsequent image pickup (step ST10). In contrast, when the flicker index I1 is less than the flicker index I2, the flicker detecting section 16 makes a decision that the frequency of the power supply is 50 Hz, and controls the switching section 17 such that it selects the setting signals from the first imaging parameter setting section 13 for the subsequent image pickup (step ST11).

Thus, the frequency of the power supply is detected at the initializing stage so that the setting signals from the first imaging parameter setting section 13 or the setting signals from the second imaging parameter setting section 14 are selected in response to the frequency detected.

Figure 3:
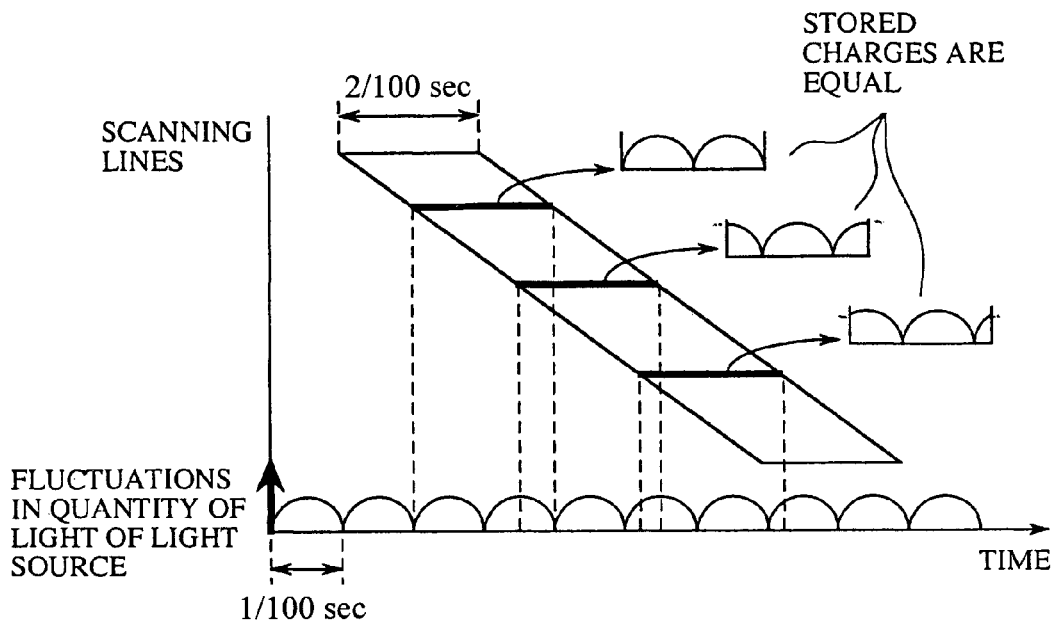
FIG. 3 is a diagram illustrating the detail (1) of a frequency detection method of a power supply, while taking an image in fluorescent lighting in a region where the frequency of the power supply is 50 Hz.
Figure 4:
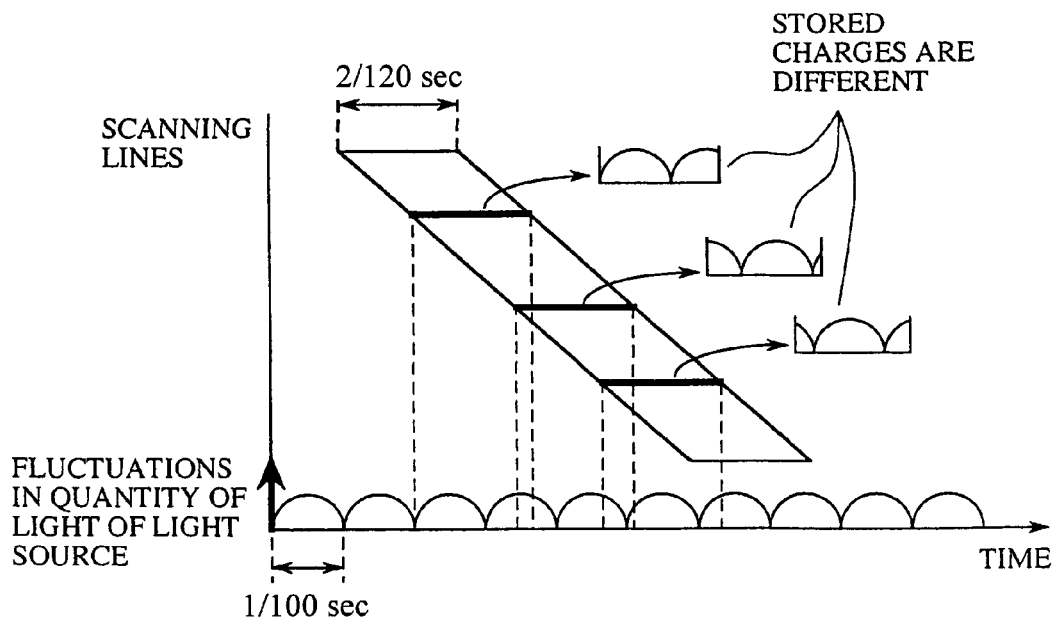
FIG. 4 is a diagram illustrating the detail (2) of the frequency detection method of the power supply, while taking an image in fluorescent lighting in the region where the frequency of the power supply is 50 Hz.

Next, the detection of the frequency of the power supply will be described in detail taking an example of capturing an image in the fluorescent lighting in a region using the power supply of 50 Hz. FIGS. 3 and 4 are diagrams illustrating the detection of the frequency of the power supply in the fluorescent lighting in the region using the power supply of 50 Hz.

In this case, the flickering period of the light source is $\frac{1}{100}$ second. Accordingly, when capturing the image using the charge storage time set by the first imaging parameter setting section 13, the charge storage time, which is the integer multiple of $\frac{1}{100}$ second, is divisible by the flickering period of the light source ($\frac{1}{100}$ second). Thus, as illustrated in FIG. 3, even if the timing of the photoelectric conversion of individual pixels of the solid-state imaging device 1 is shifted, the flicker does not take place because the amount of electric charges stored in the individual pixels on each line by the photoelectric conversion is equal.

In contrast, when the second imaging parameter setting section 14 sets the charge storage time, which is the integer multiple of $\frac{1}{120}$ second, the flicker will take place. This is because the amount of electric charges stored in the individual pixels on each line by the photoelectric conversion varies from line to line as illustrated in FIG. 4 in response to the phase relationship between the timing of the photoelectric conversion of the pixels by the solid-state imaging device 1 and the flickering of the light source, and hence the brightness of each scanning line on the frame fluctuates from line to line, resulting in the flicker consisting of repetitive patterns of horizontal stripes. When the phase relationship between the start timing of photoelectric conversion of the pixels on a line and the flickering of the light source is fixed, the horizontal stripes will stay still on the screen. However, when the phase relationship vary frame by frame, the horizontal stripes will roll up and down on the screen.

On the other hand, when capturing an image in the fluorescent lighting in a region where the frequency of the power supply is 60 Hz, the flickering period of the light source is $\frac{1}{120}$ second. Accordingly, when taking an image using the charge storage time based on the setting signal output from the first imaging parameter setting section 13, the flicker will take place. In contrast, when taking an image using the charge storage time based on the setting signal output from the second imaging parameter setting section 14, the flicker does not occur.

As described above, when the subject is still and the imaging environment is kept constant, and when the horizontal stripes roll up and down when the flicker takes place, it is possible to make a decision as to whether the flicker occurs or not by taking the image of the four frames, and by checking the variations in the projection output values of the predetermined lines by the flicker indices I1 and I2. When the variations are small, the horizontal stripes rolling up and down the screen are not present, and hence a decision is made that no flicker takes place. On the contrary, when the variations are large, the horizontal stripes rolling up and down the screen are present, and hence a decision is made that the flicker takes place.

Thus, the present embodiment 1 detects the flicker by utilizing the fact that when the flicker occurs, the horizontal stripes roll up and down, and hence the brightness of the predetermined line fluctuates frame by frame.

The presence or absence of the movement of the horizontal stripes and the speed of its rolling up and down depend upon the flickering period of the light source and a frame rate. For example, when the frame rate is 15 fps (frame per second), and the frequency of the power supply is 50 Hz, the phase relationship between the start timing of the photoelectric conversion of the pixels and the flickering of the light source varies frame by frame, resulting in the horizontal stripes rolling up and down. However, when the frequency of the power supply is 60 Hz, since the frame period (1/15 second) is an integer multiple of the flickering period of the light source (1/120 second), the phase relationship between the start timing of the photoelectric conversion of the individual pixels and the flickering of the light source is maintained constant, and hence the horizontal stripes stay still on the screen. When the horizontal stripes stay still, it is difficult to detect the flicker because the projection output values do not vary frame by frame. Thus, to apply the embodiment 1 of the image pickup apparatus, the frame period is set at a value other than the integer multiple of 1/100 second or 1/120 second so that the flicker is positively detected when the frequency of the power supply is 50 Hz or 60 Hz.

Although the present embodiment 1 calculates the flicker index from the projection output values of single lines of four frames, the flicker can be computed from the index projection output values of multiple lines.

Although the embodiment 1 calculates the flicker index by accumulating the variations of the projection output values of the four frames, the number of frames over which the variations are accumulated is not limited to four. The number of frames may be three, or five or more.

As described above, the present embodiment 1 is configured such that it accumulates the plurality of pixel values on the predetermined line in each frame, computes the interframe variations in the values accumulated, computes flicker indices from the variations in the predetermined number of frames, detects the flicker in response to the flicker indices, and sets, in response to the detection result, the charge storage time of the solid-state imaging device 1 at the integer multiple of the half the reciprocal (=1/100 second) of the frequency of the power supply of 50 Hz, or at the integer multiple of the half the reciprocal (=1/120 second) of the frequency of the power supply of 60 Hz. As a result, the present embodiment 1 offers an advantage of being able to suppress the flicker positively by detecting the frequency of the power supply of the region from the flicker indices with simple configuration even if the frequency of the power supply is different depending on regions, thereby bringing about good pictures.

Furthermore, the present embodiment 1 is configured such that the calculating section 15 computes the flicker indices by accumulating the variations in the accumulation values of individual frames over the predetermined number of frames by the accumulating section 11 using the foregoing simple equation (1). As a result, when the calculating section 15 is configured with firmware, the present embodiment 1 offers an advantage of being able to reduce the processing time. On the other hand, when the calculating section 15 is configured by hardware, the present embodiment 1 offers an advantage of being able to implement it in a small scale circuit.

Embodiment 2

The present embodiment 2 of the image pickup apparatus in accordance with the present invention is configured such that it can detect the flicker even when the frame period is an integer multiple of 1/100 second or an integer multiple of 1/120 second.

Although the foregoing embodiment 1 carries out, when detecting the flicker, the image acquisition by setting the frame period at a value other than an integer multiple of 1/100 second or 1/120 second in order to positively detect the flicker in either region using the alternating power supply of 50 Hz or 60 Hz, the present embodiment 2 can detect the flicker even if the frame period is an integer multiple of 1/100 second or 1/120 second, making it possible to handle such a case where the frame rate must be 15 fps because of the limitations of the apparatus.

Since the main configuration of the present embodiment 2 of the image pickup apparatus is the same as that of the foregoing embodiment 1, the description thereof is omitted here. However, the present embodiment 2 differs from the foregoing embodiment 1 in the processing for selecting the setting signals in the initializing stage.

Next, the operation of the present embodiment 2 will be described.

Figure 5:
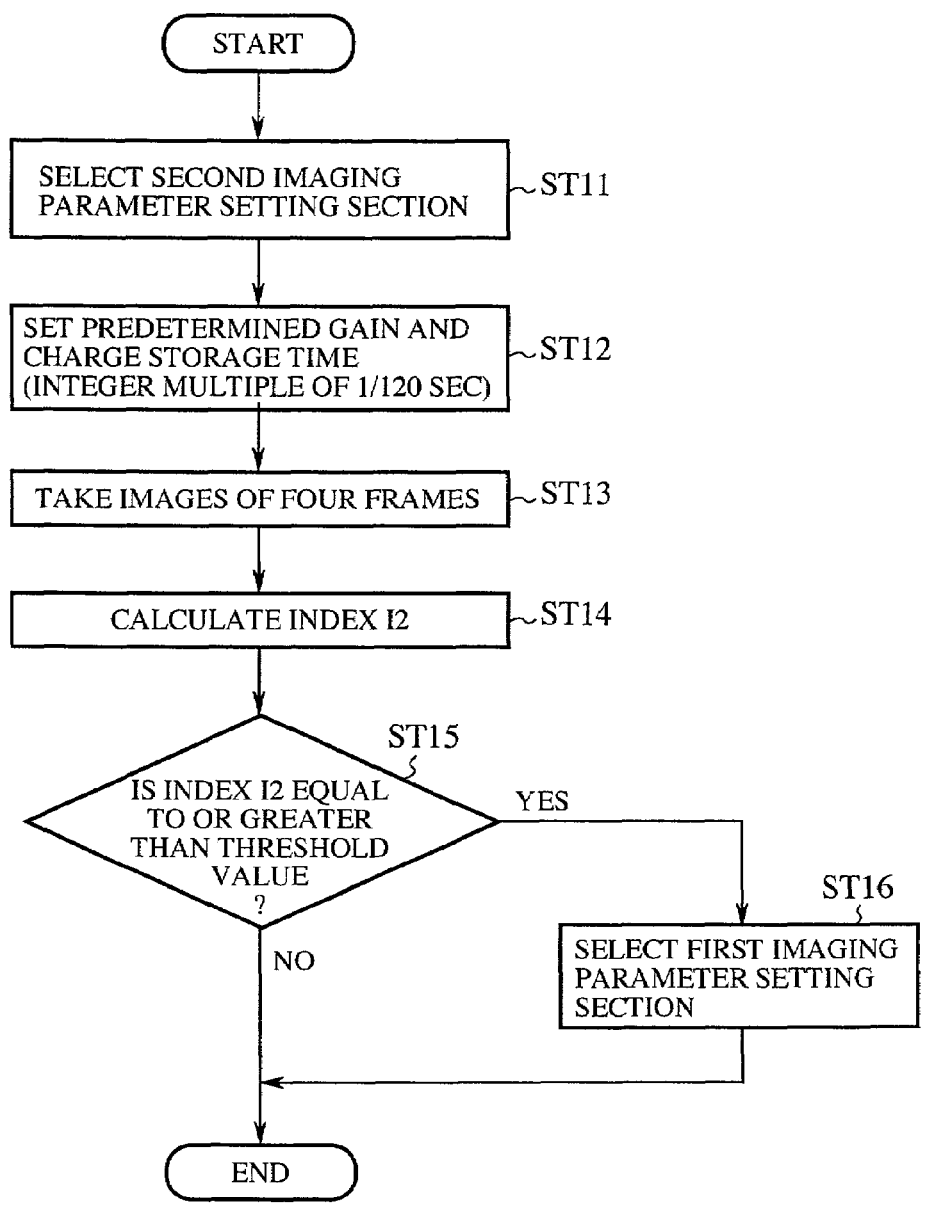
FIG. 5 is a flowchart illustrating a calculation of a present flicker index, and a selection of a gain setting signal and a charge storage time setting signal in an embodiment 2 of the image pickup apparatus in accordance with the present invention.

Here, the description is made under the assumption that the frame rate is fixed at 15 fps. FIG. 5 is a flowchart illustrating the calculation of the present flicker index and the selection of the gain setting signal and charge storage time setting signal in the present embodiment 2.

In the initializing stage of the present embodiment 2, the flicker detecting section 16 controls the switching section 17 such that it selects the setting signal from the second imaging parameter setting section 14, which sets the charge storage time (an integer multiple of 1/120 second) that can evenly divide the frame period (1/15 second in the present case) without remainder (step ST11). Then, the second imaging parameter setting section 14 outputs the predetermined gain setting signal and the charge storage time setting signal for setting the charge storage time at an integer multiple of 1/120 second (step ST12). In this condition, four frames are acquired (step ST13). While capturing the four frames, the setting values of the gain of the amplifier 3 and the charge storage time of the solid-state imaging device 1 are maintained at fixed values.

Subsequently, the accumulating section 11 computes the projection output value of the predetermined horizontal line of each frame, and supplies the projection output values computed to the calculating section 15. In response to the projection output values of the four frames, the calculating section 15 computes the flicker index I2, and supplies it to the flicker detecting section 16 (step ST14).

The, the flicker detecting section 16 makes a decision as to whether the flicker index I2 is greater than or equal to a predetermined threshold value (step ST15). When the flicker index I2 is greater than or equal to the predetermined threshold value, the flicker detecting section 16 makes a decision that the flicker takes place and that the frequency of the power supply is 50 Hz, and controls the switching section 17 such that it selects the setting signals from the first imaging parameter setting section 13 for the subsequent image pickup (step ST16) In contrast with this, when the flicker index I2 is less than the predetermined threshold value, the flicker detecting section 16 controls the switching section 17 such that it keeps selecting the setting signals from the second imaging parameter setting section 14 for the subsequent image pickup.

Thus, when the charge storage time is set at an integer multiple of 1/120 second in the region where the frequency of the power supply is 50 Hz through the processing from step ST11 to step ST13, the flicker takes place as described in the foregoing embodiment 1, it causes the horizontal stripes rolling up and down. Therefore, the flicker indices I2 exceeds the predetermined threshold value, and the switching section 17 is controlled such that it selects the setting signals fed from the first imaging parameter setting section 13.

On the other hand, when the processing from step ST11 to step ST13 is carried out in the region where the frequency of the power supply is 60 Hz, the flicker does not take place. Accordingly, as long as the subject is still and the imaging environment is kept unchanged during capturing the four frames, the flicker index I2 becomes nearly zero, and hence less the predetermined threshold value. Therefore, the switching section 17 is controlled such that it keeps selecting the setting signals fed from the second imaging parameter setting section 14.

In this way, the setting signals fed from first imaging parameter setting section 13 are selected in the region using the power supply of 50 Hz, whereas the setting signals fed from second imaging parameter setting section 14 are selected in the region using the power supply of 60 Hz, so that the flicker is suppressed appropriately in response to the frequency of the power supply.

As described above, the present embodiment 2 is configured such that the flicker detecting section 16 compares the flicker index that is obtained by the first imaging parameter setting section 13 or by the second imaging parameter setting section 14 with the predetermined threshold value, and controls the switching section 17 in response to the compared result. As a result, the present embodiment 2 offers an advantage of being able to suppress the flicker positively and to obtain good pictures by detecting the frequency of the power supply of the region in response to the flicker index even when the frame period of the image pickup apparatus is an integer multiple of the charge storage time that is set by the first imaging parameter setting section 13 or by the second imaging parameter setting section 14 (in the foregoing example, when the frame period is an integer multiple of the charge storage time set by the second imaging parameter setting section 14).

Embodiment 3

The present embodiment 3 of the image pickup apparatus in accordance with the present invention makes a decision, when the movement of the subject or the change in the imaging environment takes place, as to whether the fluctuations in the projection output values are based on the flicker or on the movement of the subject or the change in the imaging environment, thereby suppressing the flicker appropriately when it occurs.

Figure 6:
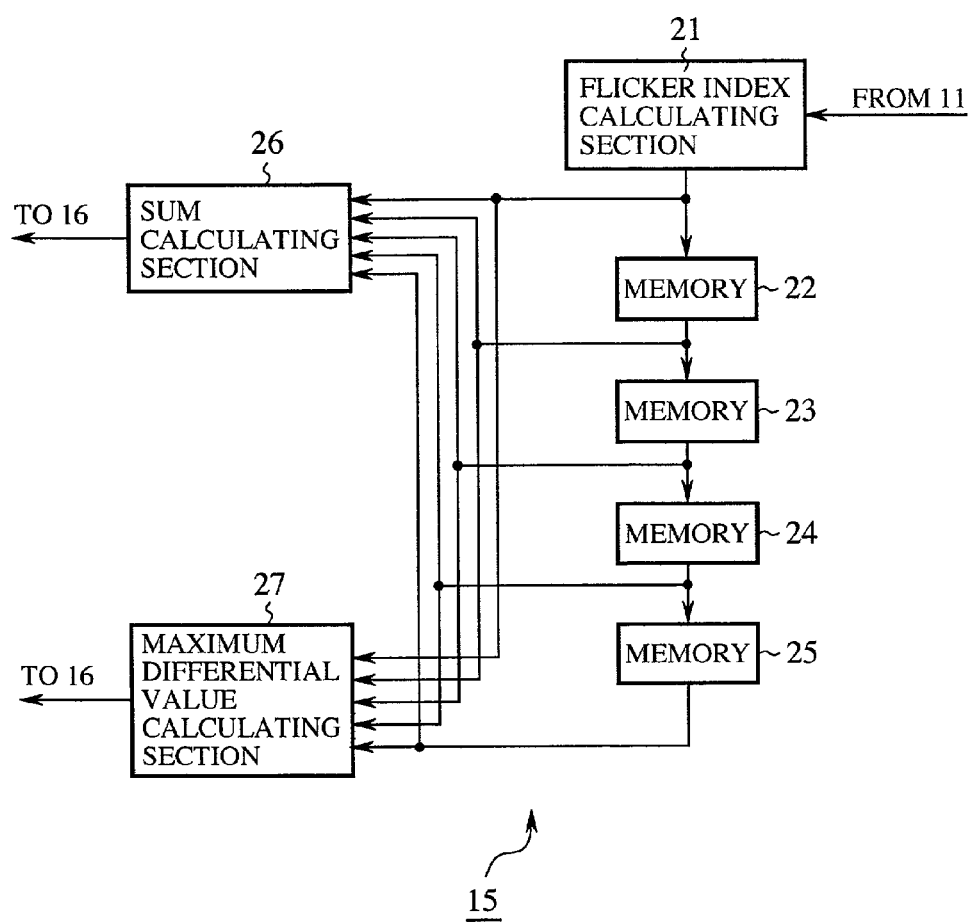
FIG. 6 is a block diagram showing a configuration of the calculating section 15 an embodiment 3 of the image pickup apparatus in accordance with the present invention.

FIG. 6 is a block diagram showing a configuration of the calculating section 15 of the embodiment 3 of the image pickup apparatus in accordance with the present invention. In FIG. 6, the reference numeral 21 designates a flicker index calculating section; reference numerals 22, 23, 24 and 25 each designate a memory for storing a flicker index in sequence; the reference numeral 26 designates a sum calculating section for calculating the sum of the flicker indices supplied from the flicker index calculating section 21 and memories 22–25; and 27 designates a maximum differential value calculating section for computing the difference between the maximum value and the minimum value of the flicker indices fed from the flicker index calculating section 21 and memories 22–25.

Since the remaining configuration of the present embodiment 3 of the image pickup apparatus is the same as that of the foregoing embodiment 1, the description thereof is omitted here.

Next, the operation of the present embodiment 3 will be described.

The flicker index calculating section 21 calculates the flicker indices at every three frames from the projection output values D(3k), D(3k+1) and D(3k+2) from the accumulating section 11 according to the following equation (2), and outputs them. For example, when k=0, it calculates the sum of the variations of the projection output values between the zeroth and first frames and the variations of the projection output values between the first and second frames. Likewise, when k=1, it calculates the sum of the variations of the projection output values between the third and fourth frames and the variations of the projection output values between the fourth and fifth frames. Thus, the values output from the flicker index calculating section 15 are updated at every three frames.

$$I=abs\{D(3k+1)-D(3k)\}+abs\{D(3k+2)-D(3k+1)\} \quad (2)$$

The flicker indices output from the flicker index calculating section 21 at every three frames are transferred to the memories 22–25 successively. Thus, the memory 22 receives the flicker index output from the flicker index calculating section 21 three frames later, and updates its flicker index at every three frames. Likewise, the memory 23 receives the flicker index output from the memory 22 three frames later, and updates its flicker index at every three frames; the memory 24 receives the flicker index output from the memory 23 three frames later, and updates its flicker index at every three frames; and the memory 25 receives the flicker index output from the memory 24 three frames later, updates its flicker index at every three frames, and outputs its flicker index it stored.

The sum calculating section 26 sums up the flicker indices output from the flicker index calculating section 21 and memories 22–25 at every three frames, and supplies the sums to the flicker detecting section 16. At the same time, the maximum differential value calculating section 27 calculates the difference between the maximum value and minimum value of the flicker indices output from the flicker index calculating section 21 and memories 22–25 at every three frames, and supplies the difference to the flicker detecting section 16.

The flicker detecting section 16 of the present embodiment 3 sets the timing that enables the change of the gain of the amplifier 3 and the change of the charge storage time of the solid-state imaging device 1 at every three frames such as just before the zeroth frame, between the second and third frames, between the fifth and sixth frame, etc., and controls the switching section 17 at the timing in response to the value fed from the sum calculating section 26 and the value fed from the maximum differential value calculating section 27.

Figure 7:
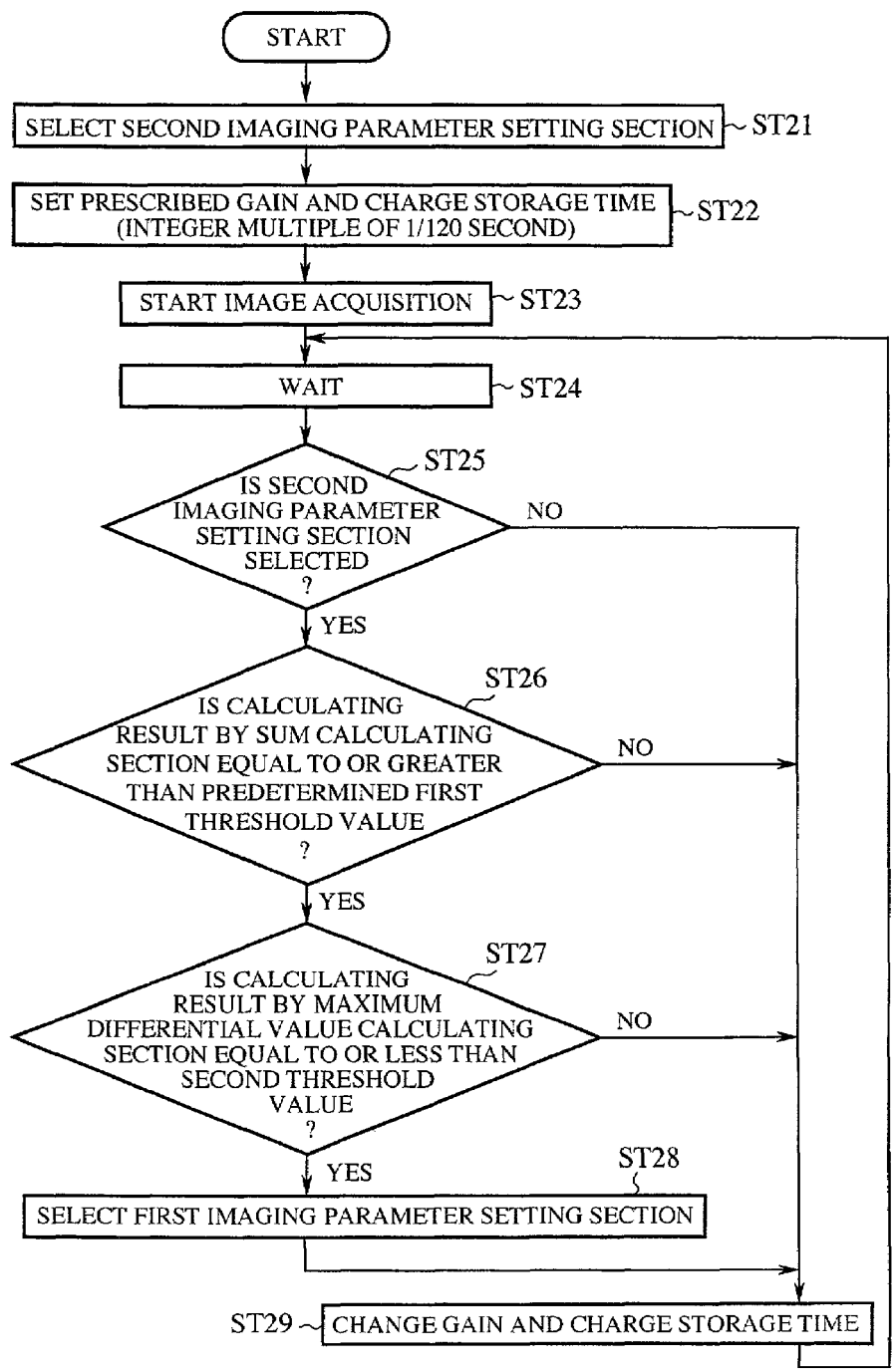
FIG. 7 is a flowchart illustrating the operation of the flicker detecting section of the embodiment 3.

Next, the operation of the flicker detecting section 16 of the present embodiment 3 will be described. FIG. 7 is a flowchart illustrating the operation of the flicker detecting section 16 of the present embodiment 3.

The flicker detecting section 16 controls the switching section 17 such that it selects the setting signals from the second imaging parameter setting section 14, first (step ST21) The second imaging parameter setting section 14 outputs the prescribed gain setting signal along with the charge storage time setting signal for setting the charge storage time at an integer multiple of $\frac{1}{120}$ second (step ST22), in response to which the image pickup is started (step ST23). Since the output values of the calculating section 15 are updated at every three frames, the flicker detecting section 16 waits for a predetermined time period until the imaging of the second frame is completed, and the corresponding calculation results are output from the calculating section 15 (step ST24).

Afterward, when the calculating section 15 updates its output values, the flicker detecting section 16 makes a decision as to whether the setting signals from the second imaging parameter setting section 14 are selected or not. In this case, the frame period (such as 1/15 second) is divisible by the setting signal of the charge storage time (integer multiple of 1/120 second) that is output from the second imaging parameter setting section 14 (step ST25).

When the setting signals from the second imaging parameter setting section 14 is currently selected, the flicker detecting section 16 makes a decision as to whether the value fed from the sum calculating section 26 is equal to or greater than a predetermined first threshold value (step ST26). When the value from the sum calculating section 26 is equal to or greater than the predetermined first threshold value, the flicker detecting section 16 makes a decision as to whether the value from the maximum differential value calculating section 27 is equal to or less than the second threshold value (step ST27).

When the value from the maximum differential value calculating section 27 is equal to or less than the second threshold value, the flicker detecting section 16 controls the switching section 17 such that it-selects the setting signals fed from the first imaging parameter setting section 13 for the subsequent imaging (step ST28).

When the decisions are made that the setting signals output from the second imaging parameter setting section 14 are not selected at step ST25, that the value from the sum calculating section 26 is less than the first threshold value at step ST26, and that the value from the maximum differential value calculating section 27 exceeds the second threshold value at step ST27, and when the processing at step ST28 has completed, the first imaging parameter setting section 13 and second imaging parameter setting section 14 each generate the gain setting signal of the amplifier 3 and the charge storage time setting signal from the imaging parameter setting values fed from the calculating section 12, and outputs them. Subsequently, the processing returns to step ST24, and the processing from step ST24 to step ST29 is iterated at every three frames.

Thus, the present embodiment 3 is configured such that it makes a decision as to whether the fluctuations in the projection output values arise from the flicker or from the up and down movement of the subject, in response to the value fed from the sum calculating section 26 and the value fed from the maximum differential value calculating section 27, and that only when the fluctuations in the projection output values result from the flicker, it controls the switching section 17 such that it selects the setting signals fed from the first imaging parameter setting section 13 in place of the setting signals fed from the second imaging parameter setting section 14.

Figure 8:
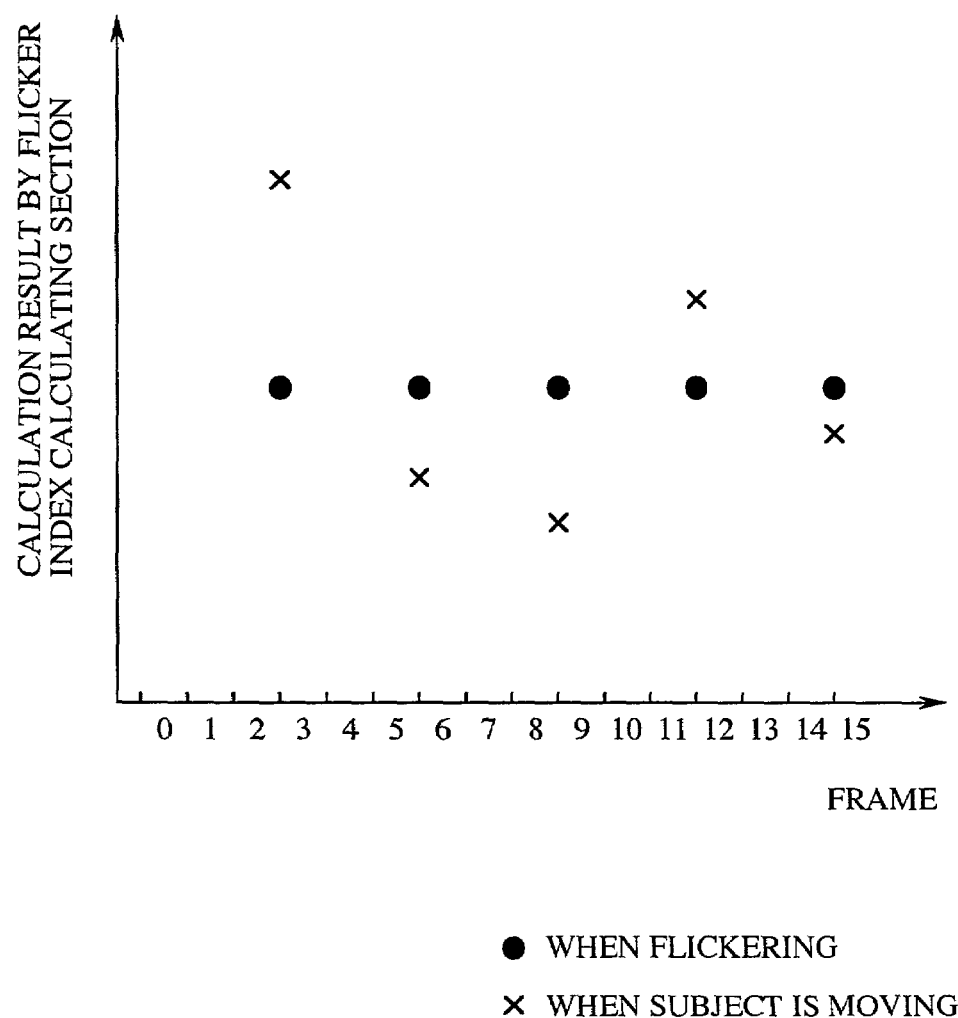
FIG. 8 is a diagram illustrating outputs of the calculating section 15 of the embodiment 3.

As described in the foregoing embodiment 1, when the frame rate is 15 fps, and the charge storage time (equal to an integer multiple of 1/120 second) is set in response to the setting signals fed from the second imaging parameter setting section 14, the flicker involving the horizontal stripes that roll up and down takes place in the region using the power supply of 50 Hz. In this case, the phase relationship between the start timing of the photoelectric conversion of the pixels and the flickering of the light source is synchronized at every three frames (that is, at intervals of 1/5 second=1/15 second×3). Accordingly, the phase relationship between the horizontal stripes and the scanning lines are also synchronized at every three frames. Therefore, when the projection output values are fluctuating because of the flicker, the output of the calculating section 15 is nearly constant as illustrated in FIG. 8. On the other hand, when the projection output values are fluctuating because of the movement of the subject, the output of the calculating section 15 will vary at random as illustrated in FIG. 8. Thus, the output of the maximum differential value calculating section 27 takes a large value when the subject is moving, but a small value when the flicker occurs. Accordingly, it is possible to make a decision as to whether the fluctuations of the projection output values arise from the flicker or from the movement of the subject by comparing the maximum differential value with the second threshold value.

Although the timing for changing the setting values of the gain and charge storage time is set at an interval of three frames in order to synchronize the timing with the timing for calculating the flicker indices in the present embodiment 3, the timing for changing the setting values can be set at an interval of a frame.

As described above, the present embodiment 3 is configured such that the calculating section 15 stores the flicker indices of the predetermined number of frames, which are calculated from the accumulation values by the flicker index calculating section 21, and calculates the sum of the flicker indices of the predetermined number of frames, and the difference between the maximum value and minimum value of the flicker indices of the predetermined number of frames as the flicker indices to be supplied to the flicker detector 16. As a result, the present embodiment 3 offers an advantage of being able to decide whether the fluctuations in the accumulation values are due to the flicker or to the movement of the subject, and to suppress the flicker appropriately.

Embodiment 4

The present embodiment 4 of the image pickup apparatus in accordance with the present invention is characterized by comprising a threshold value setting section for setting the threshold value of the flicker detecting section 16 of the foregoing embodiment 3 in response to the image signal.

Figure 9:
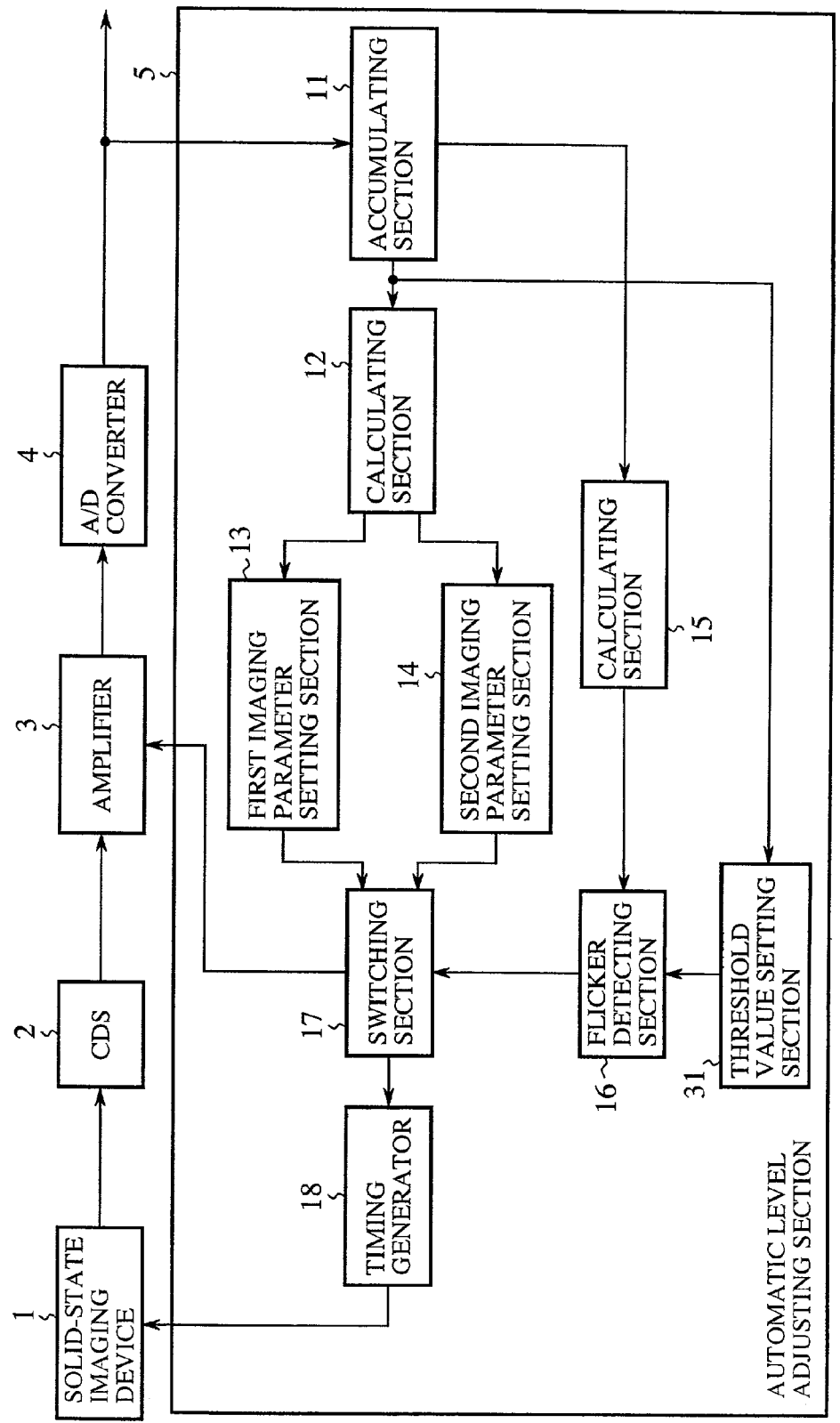
FIG. 9 is a block diagram showing a configuration of an embodiment 4 of the image pickup apparatus in accordance with the present invention.

FIG. 9 is a block diagram showing a configuration of the embodiment 4 of the image pickup apparatus in accordance with the present invention. In this figure, the reference numeral 31 designates a threshold value setting section for setting the threshold value of the flicker detecting section 16 in response to the value fed from the accumulating section 11, that is, the image level. Since the remaining configuration of FIG. 9 is the same as that of the foregoing embodiment 3, the description thereof is omitted here.

Next, the operation of the present embodiment 4 will be described.

During flickering, the value output from the flicker index calculating section 21 (see, FIG. 6) is not fixed, but varies depending on the brightness of the image or the changing degree of the quantity of light of the light source. When the image is bright, the horizontal stripes of the flicker conspicuous, whereas they are inconspicuous when the image is dark.

In view of the fact, the threshold value setting section 31 varies the first threshold value and/or second threshold value in response to the image level. Since the output from the accumulating section 11 is proportional to the brightness of the image, the threshold value setting section 31 can vary the first threshold value and/or second threshold value in proportion to the output of the accumulating section 11.

Since the remaining operation of the present embodiment 4 is the same as that of the foregoing embodiment 3, the description thereof is omitted here.

Figure 10:
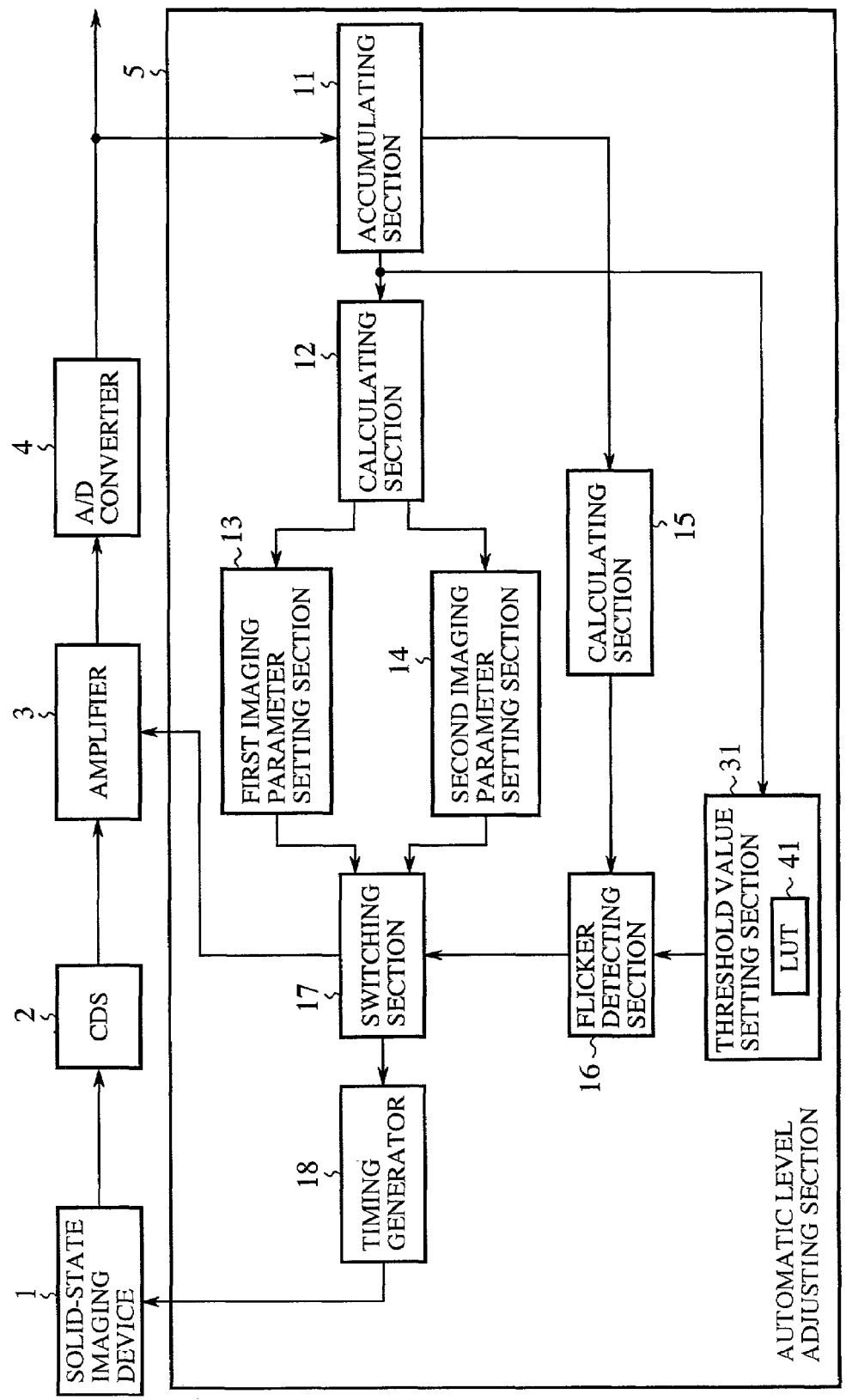
FIG. 10 is a block diagram showing another configuration of the embodiment 4 of the image pickup apparatus in accordance with the present invention.

Alternatively, the threshold value setting section 31 can vary the first threshold value and/or second threshold value nonlinearly against the output of the accumulating section 11. FIG. 10 is a block diagram showing another configuration of the embodiment 4 of the image pickup apparatus in accordance with the present invention. In this figure, the reference numeral 41 designates an LUT (look-up table) installed in the threshold value setting section 31 for prestoring the nonlinear correspondence between the output of the accumulating section 11 and the first threshold value and/or second threshold value. Referring to the LUT 41, the threshold value setting section 31 selects the threshold value(s) corresponding to the value from the accumulating section 11, and sets it (them) to the flicker detecting section 16.

As described above, since the present embodiment 4 is configured such that it changes the first threshold value and/or second threshold value of the flicker detecting section 16 in response to the image level, it offers an advantage of being able to improve the detection accuracy of the flicker. In addition, since the present embodiment 4 sets the threshold value(s) referring to the LUT 41, it offers an advantage of being able to set the first threshold value and/or second threshold value nonlinearly against the output of the accumulating section 11 with ease.

Embodiment 5

The present embodiment 5 of the image pickup apparatus in accordance with the present invention is characterized by comprising a masking section for masking the control signal from the flicker detecting section 16 to the switching section 17 to halt the switching operation of the switching section 17.

Figure 11:
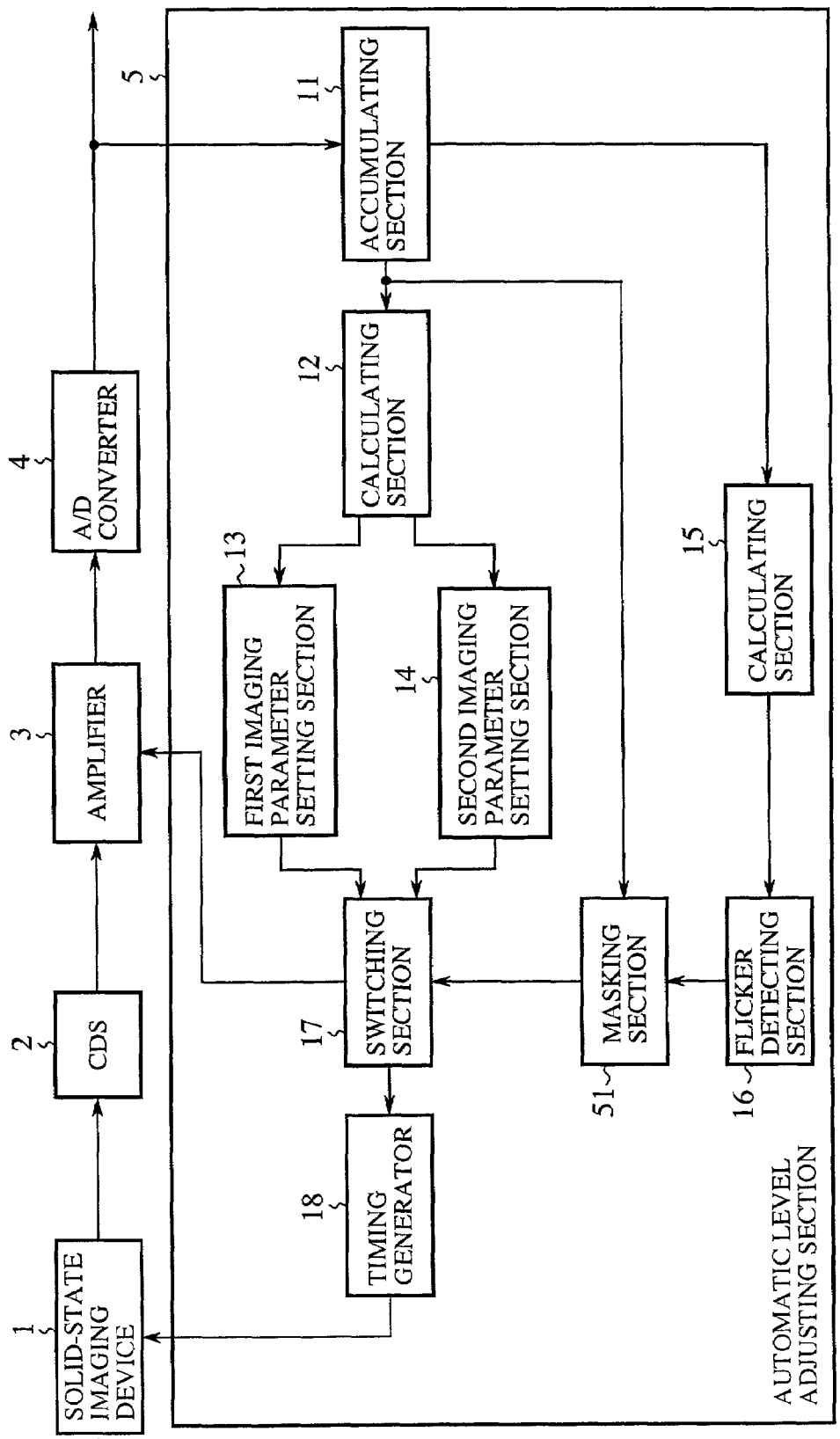
FIG. 11 is a block diagram showing a configuration of an embodiment 5 of the image pickup apparatus in accordance with the present invention.

FIG. 11 is a block diagram showing a configuration of the embodiment 5 of the image pickup apparatus in accordance with the present invention. In this figure, the reference numeral 51 designates a masking section for masking the control signal to the switching section 17 in response to the accumulation value the accumulating section 11 calculates from all or part of the frame of an image signal captured by the solid-state imaging device 1. Since the remaining configuration of FIG. 11 is the same as that of the foregoing embodiment 1, the description thereof is omitted here.

Next, the operation of the present embodiment 5 will be described.

When the image is extremely dark or bright, no flicker takes place on the screen. In view of this, the masking section 51 decides the brightness of the image from the accumulation value obtained by the accumulating section 11, and masks the control signal to the switching section 17 in response to the brightness. Specifically, since the output from the accumulating section 11 is proportional to the brightness of the image, the masking section 51 masks the control signal to the switching section 17 when the value output from the accumulating section 11 is less than a predetermined value, or exceeds another predetermined value.

Since the remaining operation is the same as that of the foregoing embodiment 1, the description thereof is omitted here.

Figure 12:
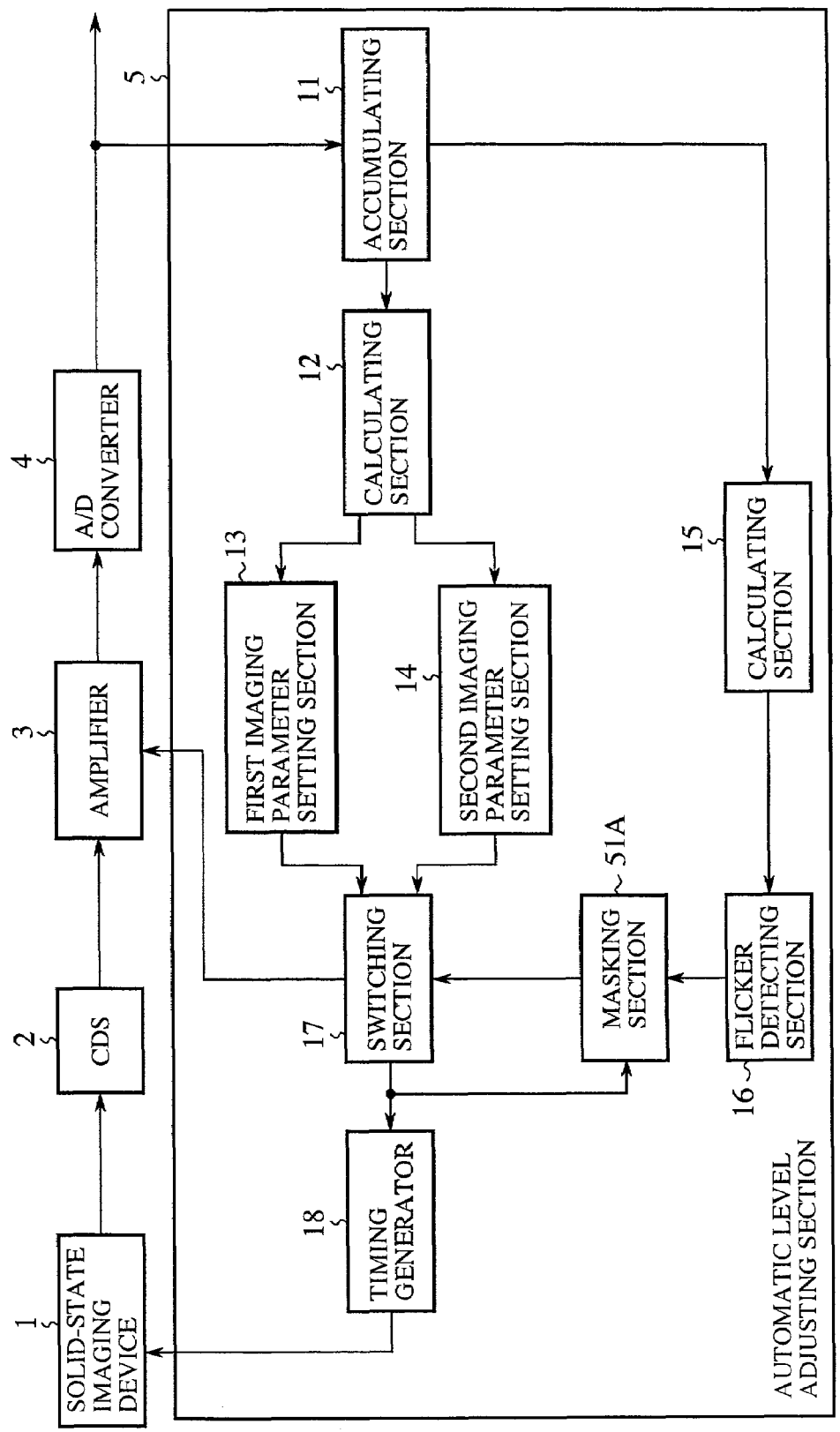
FIG. 12 is a block diagram showing another configuration of the embodiment 5 of the image pickup apparatus in accordance with the present invention.

Instead of using the value output from the accumulating section 11, the control signal to the switching section 17 can be masked using the charge storage time that is set by the setting signal supplied to a timing generator 18. FIG. 12 is a block diagram showing another configuration of the embodiment 5 of the image pickup apparatus in accordance with the present invention. In this figure, the reference numeral 51A designates a masking section for masking the control signal to the switching section 17 in response to the charge storage time that is set by the setting signal supplied to the timing generator 18. When the quantity of light of the light source is large, the charge storage time is set at a value smaller than $1/100$ second or $1/120$ second. If the imaging parameter setting section is switched in this state, the flicker can take place when the quantity of light reduces thereafter. Taking account of this, the masking section 51A makes a decision as to whether the setting value of the charge storage time is equal to or less than a predetermined value from the charge storage time setting signal that is supplied to the timing generator 18, and when the charge storage time setting value is equal to less than the predetermined value, the masking section 15A masks the control signal to the switching section 17.

Figure 13:
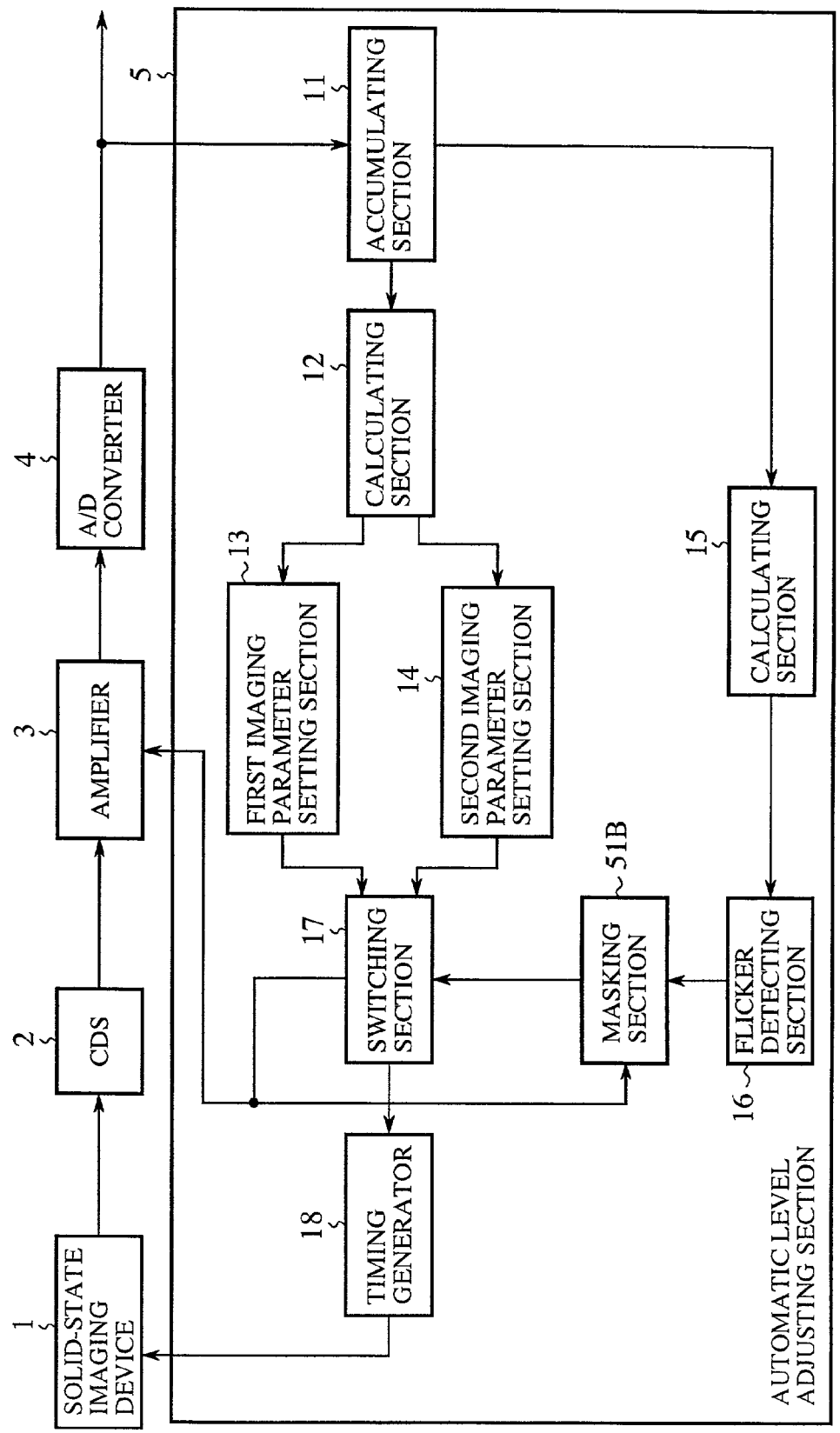
FIG. 13 is a block diagram showing still another configuration of the embodiment 5 of the image pickup apparatus in accordance with the present invention.
Figure 14:
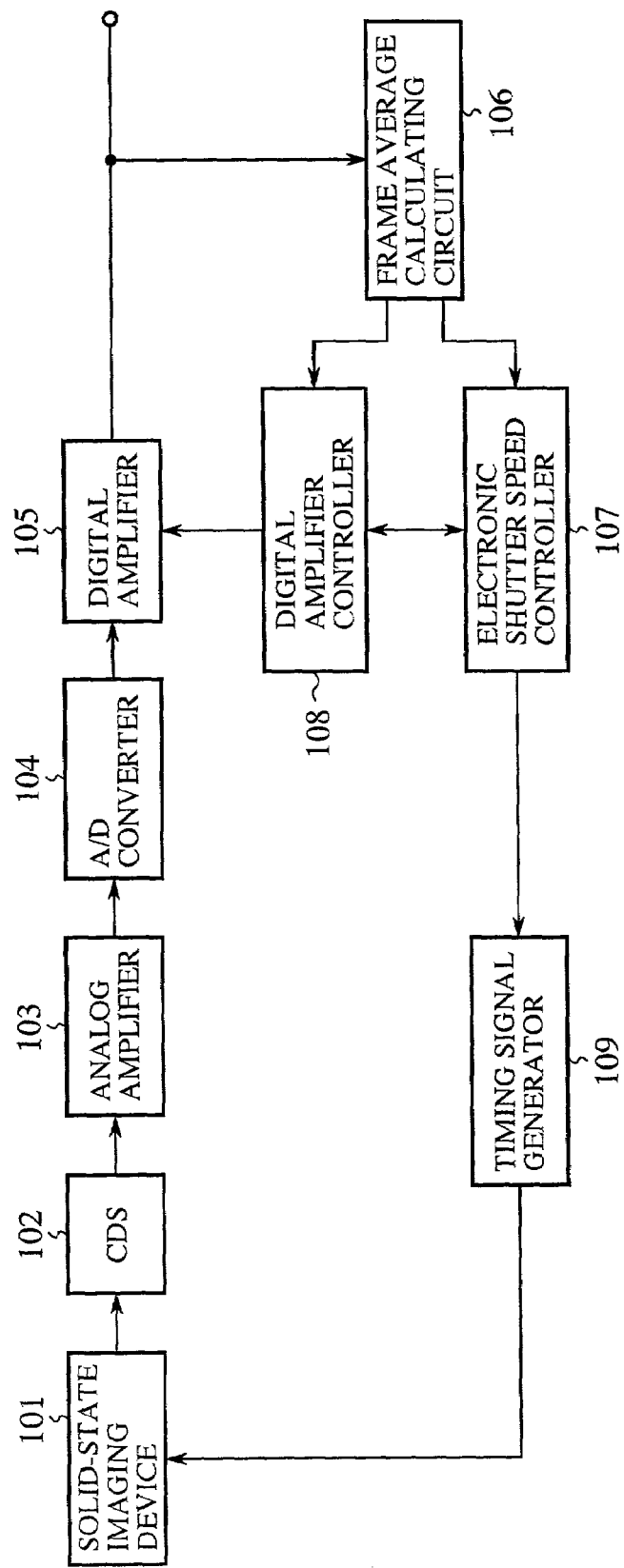
FIG. 14 is a block diagram showing a configuration of an automatic level adjusting apparatus for implementing a conventional automatic level adjusting method.
Figure 15:
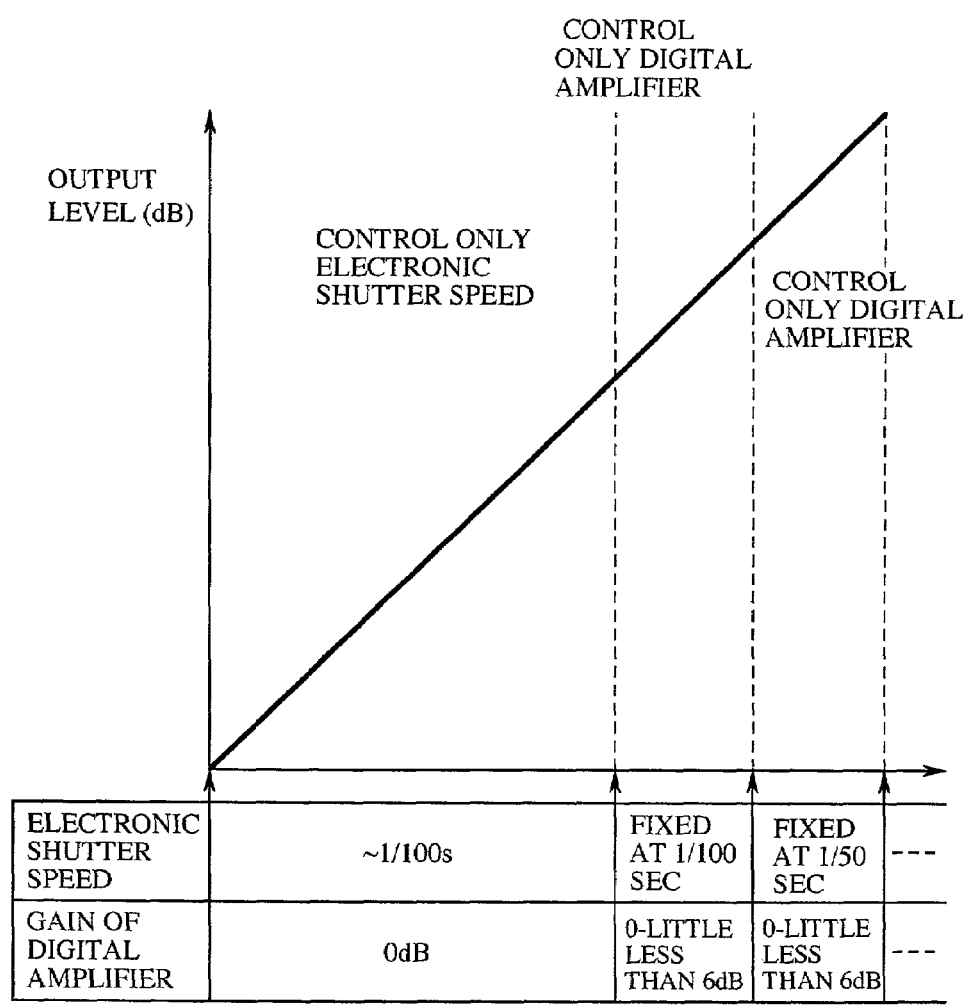
FIG. 15 is a diagram illustrating the conventional automatic level adjusting method in detail.

Alternatively, in place of using the value output from the accumulating section 11, the control signal to the switching section 17 can be masked in response to the gain of the amplifier 3. FIG. 13 is a block diagram showing still another configuration of the embodiment 5 of the image pickup apparatus in accordance with the present invention. In this figure, the reference numeral 51B designates a masking section for masking the control signal to the switching section 17 in response to the gain of the amplifier 3 which is set by the gain setting signal to the amplifier 3. As the gain of the amplifier 3 is increased, the noise on the image can increase, and hence the flickering frequency of the light source can be misidentified because of the fluctuations in the image data due to the noise, in which case the flicker cannot be suppressed appropriately. In view of this, the masking section 51B masks the control signal to the switching section 17 when the gain setting value is equal to or greater than a predetermined value.

As described above, since the present embodiment 5 is configured such that it masks the control signal from the flicker detecting section 16 to the switching section 17 in response to the brightness of the images, the charge storage time of the solid-state imaging device 1 or the gain of the amplifier 3. As a result, the present embodiment 5 offers an advantage of being able to reduce the possibility of misidentifying the flicker.

The foregoing embodiments employ the power supply with a frequency of 50 Hz or 60 Hz, and this does not present any problem in Japan. In a region like a foreign country using the power supply with a frequency other than 50 Hz or 60 Hz, the same effect can be achieved by configuring the image pickup apparatus in accordance with the present invention such that it can handle the frequency of the power supply of that region.

What is claimed is:

1. An image pickup apparatus comprising:
    a solid-state imaging device for generating an image signal by carrying out photoelectric conversion of individual pixels at different timings;
    an amplifier for amplifying the image signal; and
    an automatic level adjusting section for regulating a level of the image signal at a specified level by automatically controlling a charge storage time of said solid-state imaging device and a gain of said amplifier,
    wherein said automatic level adjusting section comprises:
       a first setting section for setting the charge storage time of said solid-state imaging device at an integer multiple of half a reciprocal of a frequency of a first power supply;
       a second setting section for setting the charge storage time of said solid-state imaging device at an integer multiple of half a reciprocal of a frequency of a second power supply;

a switching section for selecting one of said first setting section and said second setting section to set the charge storage time of said solid-state imaging device;

an accumulating section for accumulating a plurality of pixel values of a predetermined line in a frame;

an index calculating section for calculating inter-frame variations of accumulation values obtained by said accumulating section, and for calculating an index for detecting the flicker from the inter-frame variations of a predetermined number of frames; and a flicker detecting section for detecting flicker in response to the index of said index calculating section, and for controlling said switching section in response to the detecting of the flicker.

2. The image pickup apparatus according to claim 1, wherein said first setting section sets the charge storage time of said solid-state imaging device at an integer multiple of $\frac{1}{100}$ second, and said second setting section sets the charge storage time of said solid-state imaging device at an integer multiple of $\frac{1}{120}$ of a second.

3. The image pickup apparatus according to claim 1, wherein said index calculating section calculates the index by accumulating the variations of accumulation values of individual frames over a predetermined number of frames over which accumulation values are obtained by said accumulating section.

4. The image pickup apparatus according to claim 3, wherein said flicker detecting section compares the index obtained when said first setting section is in operation with the index obtained when said second setting section is in operation, and controls said switching section in response to a result of the comparison.

5. The image pickup apparatus according to claim 3, wherein said flicker detecting section compares the index obtained when one of said first setting section and said second setting section is in operation with a predetermined threshold value, and controls said switching section in response to a result of the comparison.

6. The image pickup apparatus according to claim 1, wherein said index calculating section comprises:

a plurality of memories for storing indices calculated from accumulation values obtained by said accumulating section over a predetermined number of frames;

a sum calculating section for calculating a sum of the indices of the predetermined number of frames; and a maximum differential calculating section for calculating a difference between a maximum value and a minimum value of the indices of the predetermined number of frames.

7. The image pickup apparatus according to claim 1, further comprising a threshold value setting section for setting a predetermined threshold value to be supplied to said flicker detecting section in response to the image signal captured by said solid-state imaging device, wherein said flicker detecting section detects the flicker by comparing the index with the threshold value.

8. The image pickup apparatus according to claim 7, wherein said threshold value setting section comprises a look-up table, and sets the threshold value corresponding to the image signal by referring to the look-up table.

9. The image pickup apparatus according to any one of claim 1, further comprising a masking section for masking a control signal supplied from said flicker detecting section to said switching section to halt the switching operation of said switching section.

10. The image pickup apparatus according to claim 9, wherein said masking section masks the control signal to said switching section in response to an accumulation value obtained by said accumulating section, the accumulation value being obtained by accumulating the pixel values over all or part of a frame of the image signal captured by said solid-state imaging device.

11. The image pickup apparatus according to claim 9, wherein said masking section masks the control signal to said switching section in response to the charge storage time of said solid-state imaging device.

12. The image pickup apparatus according to claim 9, wherein said masking section masks the control signal to said switching section in response to a gain of said amplifier.

13. An automatic level adjusting method applied to an image pickup apparatus including a solid-state imaging device for generating an image signal by carrying out photoelectric conversion of individual pixels at different timings, and an amplifier for amplifying the image signal, said automatic level adjusting method regulating a level of the image signal at a specified level by automatically controlling a charge storage time of said solid-state imaging device and a gain of said amplifier, and said automatic level adjusting method comprising the steps of:

accumulating a plurality of pixel values of a predetermined line in a frame;

calculating inter-frame variations of accumulation values, and calculating an index for detecting flicker from the inter-frame variations of a predetermined number of frames;

detecting the flicker in response to the index; and setting, in response to the detecting of the flicker, the charge storage time of said solid-state imaging device at one of an integer multiple of half a reciprocal of a frequency of a first power supply and an integer multiple of half a reciprocal of a frequency of a second power supply.

* * * * *